Sept. 11, 1962    R. F. LUEDTKE    3,052,914
PANFISH FILLETING DEVICE
Filed Sept. 20, 1961    2 Sheets-Sheet 1

INVENTOR.
ROBERT F. LUEDTKE
BY
William F. Woods
ATTORNEY

Sept. 11, 1962 R. F. LUEDTKE 3,052,914
PANFISH FILLETING DEVICE
Filed Sept. 20, 1961 2 Sheets-Sheet 2

INVENTOR.
ROBERT F. LUEDTKE
BY
William F. Woods
ATTORNEY

United States Patent Office 3,052,914
Patented Sept. 11, 1962

3,052,914
PANFISH FILLETING DEVICE
Robert F. Luedtke, 405 W. 12th St., Glencoe, Minn.
Filed Sept. 20, 1961, Ser. No. 139,480
6 Claims. (Cl. 17—7)

This invention relates to devices used for separating the flesh from the bones and skeleton of a fish; in particular, it concerns novel and improved means for filleting a fish and is especially useful for efficiently stripping the meat from small sized fish such as bluegills, sunfish, perch, crappies and other panfish.

One of the problems encountered in cleaning small fish is the separation of the flesh from the bones without leaving much of the meat attached to the bones. And if all of the meat is used it should not contain any of the objectionable small bones frequently cut from the rib cage along with the meat. This is very important when one considers the hazards involved when small children are served pieces of fish with some of the bones still in the flesh. Even small flexible bones have been known to cause choking, or even puncture the internal organs.

Previous means for meeting these problems has included apparatus designed to process fish by subjecting them to the action of band type knives that are powered by a complex arrangement of machinery and conveying means. Obviously this type of apparatus is not equivalent to a simple hand operated device adapted to perform the task without any outlay of expensive capital equipment and elaborate facilities. Other means that have been used to cut and fillet fish have included knives and saws adapted to slice the flesh from the fish with one hand while the fish is being held in the other hand. These work fairly well considering the fact that they are primarily intended for large fish that are easy to handle and control, but they don't perform too efficiently when one has to use them on a small panfish. And, of course, there is the original hand method of filleting and cleaning fish which involves nothing more than a sharp knife, a fish and considerable skill and dexterity. The latter method, in addition to being quite slow, is also rather dangerous for the novice or fisherman who doesn't make a living either guiding or working as a fish cleaner in a commercial fishery.

Accordingly, it is an object of this invention to provide a fish filleting device that will overcome the disadvantages and limitations listed above.

Another important object of this invention is to provide a new and improved fish filleting device.

A further object of this invention is to provide a panfish filleting device that is simple to operate, economical to manufacture, low in cost and highly efficient.

Another object of this invention is to provide in a panfish filleting device novel and improved means for separating the flesh from the bones.

Yet another object of this invention is to provide in a panfish filleting device novel and improved means for holding the fish during the filleting operation.

Still another object of this invention is to provide a panfish filleting device having positive means for restraining the rib cage of a fish while the flesh is stripped therefrom.

Another object of this invention is to provide a fish filleting device adapted to perform efficiently upon small fish of the panfish type.

A further object of this invention is to provide in a fish filleting device of the type described novel and improved means for holding relatively small fish carcasses whereby to quickly and efficiently remove the flesh therefrom with a minimum of waste.

These and other objects and advantages of the invention will become more fully apparent from a consideration of the following detailed description and accompanying drawing wherein an embodiment of the invention is shown by way of illustration and not by way of limitation.

Figure 1:
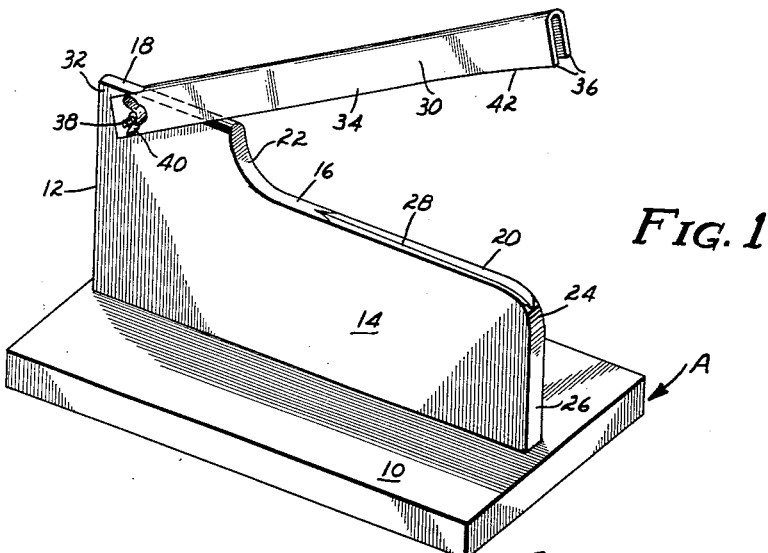
FIGURE 1 is a perspective view of the fixture forming part of the invention.

Referring now to the drawing, reference character A designates a fish carcass holding fixture consisting of a generally flat base member 10 and a generally vertical fish holding stand 12 positioned intermediate the longitudinal edges of base member 10 and substantially equal in length thereto. As shown in FIGURE 1, stand 12 has a pair of opposed parallel side walls 14 mounted in an upstanding or vertical relation to the top horizontal surface 16 of base 10. Stand 12 is relatively thin and of greater length than width. The top surface of stand 12 is provided at the rear end thereof with an upper generally horizontal section 18 which blends into a forward lower horizontal section 20 by virtue of an upwardly curved section 22 that connect surfaces 18 and 20. The forward edge of lower section 20 terminates in a curved surface 24 which intersects and communicates with the forward vertical edge 26 of stand 12. A longitudinal groove 28 is milled into the lower horizontal section 20 from its intersection with edge 26 to a point slightly forward of curved surface 24, as shown in FIGURE 1.

Pivotally carried by stand 12 is clamping member 30 which is mounted between the rear edge 32 of stand 12 and curved section 22 thereof. Clamping member 30 consists of an elongated unitary body 34 having a pair of spaced parallel depending side walls or jaws 36 forming in cross section a generally U-shaped appearance. Pivotal connection with stand 12 is made by means of a threaded bolt 38 fastened by a wing nut 40 or other suitable means.

The spacing between jaws 36 of clamping member 30 is arranged so that at the fixed end thereof jaws 36 surround walls 14 in a freely operative manner. Forwardly of the intersection of upper surface 18 and curved section 22 jaws 36 of clamping converge slightly in a longitudinal direction so as to be in substantial vertical alignment with walls 14. In addition, the lower forward end of clamping member 30 are curved downwardly, as at 42, to complement the upwardly curved surface 24 of stand 12. As a result of this construction, clamping member 30, when pivoted forwardly into a closed position, lies in a position whereby the lower longitudinal edges of jaws 36 are in closely spaced parallel relation to the upper section 18 of stand 12.

Figure 6:
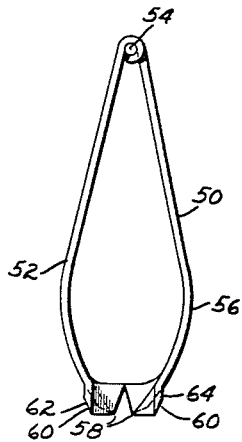
FIGURE 6 is one end view of the tool shown in FIGURE 5.
Figure 5:
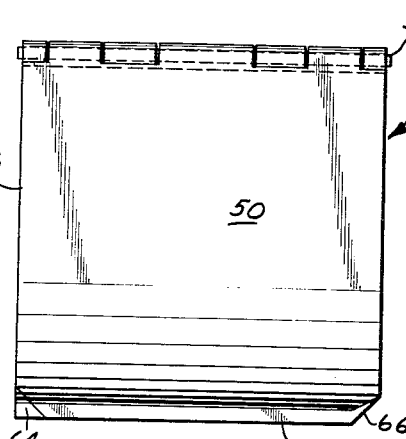
FIGURE 5 is a side view of the filleting tool forming part of the invention.
Figure 7:
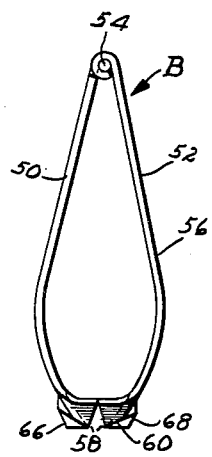
FIGURE 7 is a view of the end of the tool of FIGURE 5 opposite to the end shown in FIGURE 6.
Figure 8:
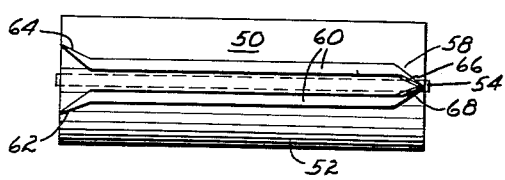
FIGURE 8 is a bottom view of the tool shown in FIGURE 5.

The details of the filleting tool used in connection with holding fixture A are disclosed in FIGURES 5–7, inclusive. This tool, designated in its entirety by reference character B, consists of a pair of opposed generally inflexible relatively thin slicing hinges 50, 52, connected at their upper longitudinal edge by means of a hinge bolt 54. Hinges 50, 52 are identical in construction and are characterized by a body 56 that is generally arcuate in transverse cross section, as illustrated in FIGURES 6 and 7. Each body 56 of hinges 50 and 52 is curved outwardly from the axis extending normal to hinge bolt 54 so as to define a roughly elliptical form extending from hinge bolt 54 to the lower longitudinal edge 58 thereof. The lower edges 58 of hinges 50, 52 is ground, as at 60, to provide a cutting edge. At one end of edges 58 the corners of bodies 56 are turned away from the plane of the outer surface thereof to form a pair of outwardly shaped ears 62, 64. At the opposite end of edges 58 of hinges 50, 52 the corners thereof are turned inwardly to form a pair of complementary engageable inwardly shaped ears 66 and 68. It is apparent that ears 66 and 68 of hinges 50, 52 are so constructed and arranged as to substantially overlie one another when filleting tool B is in a closed position. The outwardly turned ears 62, 64 guide the tool B when it is placed over the walls 14 of stand 12, while the inwardly turned ears 66, 68 provide a continuous cutting contact of tool B with the forward vertical edge 26 of stand 12, as will be explained.

Figure 2:
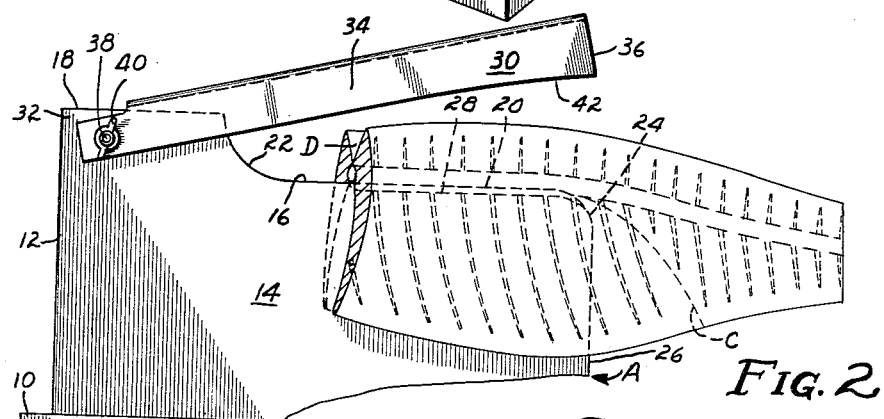
FIGURE 2 is a side view of the structure shown in FIGURE 1 with a fish carcass placed thereon.
Figure 3:
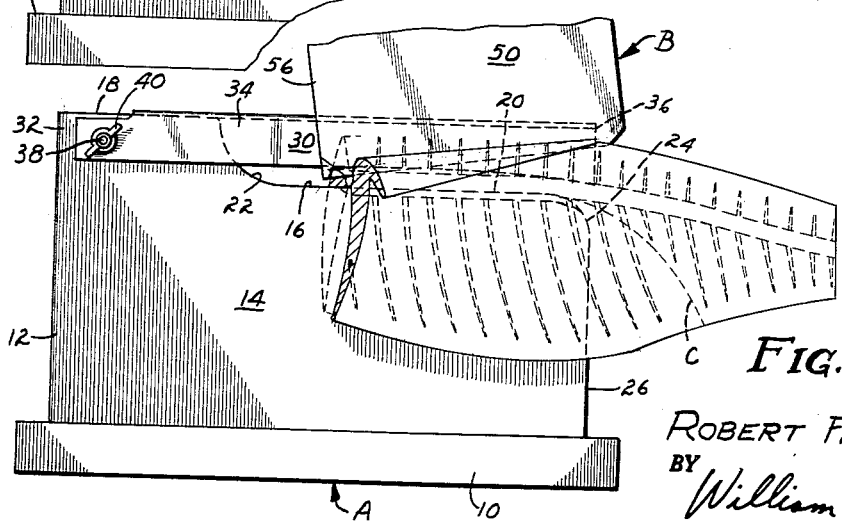
FIGURE 3 is a view similar to FIGURE 2 showing the fish carcass clamped in a filleting position.
Figure 4:
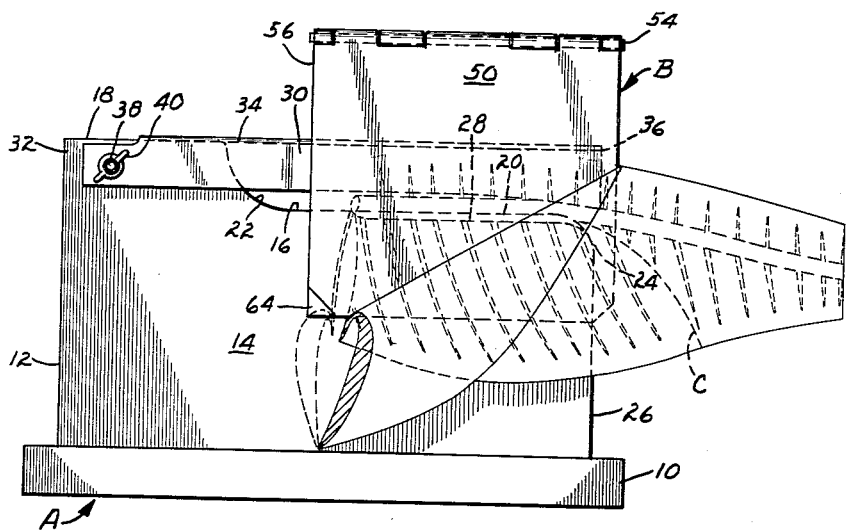
FIGURE 4 is a view similar to FIGURE 3 illustrating both components of the invention as they are used to strip the flesh from a fish carcass.

In the use of my device, a fish carcass is first prepared in the following manner: the flesh is first separated from each side of the first tail spine rearward to the tail. The cut made for this preparatory step in illustrated in FIGURE 2 by the broken line designated by the reference character C. The flesh is then cut from each side of the backbone spine to provide the longitudinal separation D illustrated in FIGURE 2. The resulting carcass is then placed upon upper surface 20 of stand 12 so that the tail spine rests adjacent vertical edge 26 thereof, the rib cage on each side of the fish being in contact with walls 14 of stand 12 with the backbone contacting groove 28 in a prone position, as illustrated in FIGURES 2–4, inclusive. Clamping member 30 is then brought down against the length of the spine and held firmly with one hand so as to hold the fish in place. Filleting tool B is then brought down over the spine so that hinges 50, 52 thereof are on each side of the spine and stand 12. Inwardly turned ears 66 and 68 of hinges 50, 52 are faced toward the tail of the fish while outwardly turned ears 62, 64 are positioned on each side of stand 12 in contact with walls 14 thereof. The filleting tool B is held at an angle of about 20° with the horizontal and applied to the fish carcass initially with a light side pressure on each hinge 50, 52 while at the same time imparting a rocking motion in the direction of the tail. When the cutting edge 60 of hinges 50, 52 reaches a position slightly below the horizontal surface 20 of stand 12, more side pressure is applied and the instrument is forced straight down in a direction towards base 10 to complete the filleting operation. These steps are shown in FIGURES 3 and 4; FIGURE 3 illustrating the initial position of filleting tool B and FIGURE 4 showing the final thrust of the tool for completing separating the flesh from the carcass.

During this process, the ribs of the fish are confined between the stand 12 and the cutting edges 60 of tool B resulting in an extremely efficient stripping of the meat from the bones. With this device even the smallest of the bones are stripped of flesh as there is no significant pulling of the bones from their attachment with the spine proper. This is due to the manner in which the carcass is held during the filleting steps and to the efficient manner in which the cutting elements of filleting tool engage and strip the flesh.

If desired, filleting tool B can be eliminated from the operation above described and a conventional knife used to strip away the flesh. However, this method requires more skill and experience than the one referred to above and frequently does not result in as efficient removal of the flesh. It is, therefore, recommended that both elements be used to obtain the most efficient utilization of the device.

My invention has been thoroughly tested and found to be very satisfactory for the use described. It is primarily intended for use on small panfish and in fact has been found satisfactory for bluegills, sunfish, crappies, etc. that are only a few inches in length (3 to 4 fish per pound). It will be obvious to those skilled in the art that my invention may be modified by many substitutions and equivalents and that this disclosure is intended to be illustrative only. Therefore, I intend to be limited solely by the scope of the appended claims.

I claim:

1. In a panfish filleting device, an upstanding fish holding stand, said stand including a pair of opposed parallel side walls engageable with the ribs of a fish and an elongated top surface adapted to support longitudinally thereon the spine of a fish, a clamping member pivotally mounted on said stand and engageable longitudinally with the spine of a fish, and a filleting hinge for stripping the flesh from a fish, said hinge including a pair of arcuate mating hinged members having longitudinal cutting edges at the bottom thereof adapted to simultaneously press the ribs of the fish into engagement with the side wall of said stand while slicing the flesh of the fish therefrom.

2. The device of claim 1 wherein the top surface of said stand is provided with a longitudinal groove for receiving the spine of a fish.

3. A panfish filleting device consisting of a fish holding stand including a horizontal base member and a vertical fish holding member, a narrow elongated horizontal top on said fish holding member, said top having a stepped configuration resulting in an upper horizontal surface and a lower horizontal surface, an elongated U-shaped clamping member pivoted at one end adjacent the upper horizontal surface of said top and overlying in closely spaced parallel relation when in a closed position said lower horizontal surface, and a filleting tool cooperable with said stand for separating the side flesh of a fish from its rib cage, said tool including a pair of identical cutting members hingedly connected at their top edge each having a lower cutting edge adapted to engage the side flesh of the fish on each side of said fish holding member, said filleting tool being arcuate in transverse cross section and having at one end of the lower edge thereof a pair of outwardly turned ears and at the other end thereof a pair of inwardly turned ears.

4. The filleting device of claim 3 wherein said fish holding member is curved at the outer end of the lower horizontal section of said top and wherein said clamping member is curved at the free end thereof complementary to said curve in said fish holding member.

5. A panfish filleting device consisting of a fish supporting stand, said stand including a base member, a vertical upstanding member on said base member, said upstanding member having co-planar vertical sides and a top in spaced relation to said base member, said top being narrow in width and including an upper generally horizontal section and a lower generally horizontal section, an arcuate section connecting said lower horizontal section with an edge of said upstanding member, a clamping member pivotally carried by said upstanding member in overlying relationship with said upper section of said top, said clamping member including a pair of spaced elongated depending sides embracing adjacent their pivoted ends the sides of said upstanding member immediately below said upper section of said top and overlying when closed said lower section of said top, said clamping member being curved along the lower free edge thereof in correspondence with said arcuate section of said upstanding member whereby to hold a fish carcass with the backbone thereof on said lower section of said top and the ribs thereof on each of the sides of said upstanding member, and a filleting hinge cooperable with said stand for separating the flesh from the skeleton of the fish, said filleting hinge including a pair of side members hingedly connected together, said side members being arcuate in cross section and having mating lower cutting edges, the cutting edges of said filleting hinge being turned away from each other at one end and closed into each other at the other end thereof.

6. The structure as described in claim 5 wherein a longitudinal central groove is provided in the lower horizontal section of said top of said upstanding member.

No references cited.